United States Patent

Brotz

[11] Patent Number: 5,306,131
[45] Date of Patent: Apr. 26, 1994

[54] PELLETIZING ROLL

[76] Inventor: Gregory R. Brotz, P.O. Box 1322, Sheboygan, Wis. 53081

[21] Appl. No.: 957,163

[22] Filed: Oct. 7, 1992

[51] Int. Cl.$^5$ .......................... B29B 9/00; B29B 9/02
[52] U.S. Cl. ................................... 425/201; 425/202; 425/310; 241/85; 264/109; 264/118
[58] Field of Search ............... 264/118, 140, 141, 142, 264/143, 144, 109; 425/331, 201, 310, 202, 294; 241/85

[56] References Cited

U.S. PATENT DOCUMENTS

| | | | |
|---|---|---|---|
| 532,481 | 1/1895 | Perky | 241/85 |
| 1,327,254 | 1/1920 | Remmers | 241/85 |
| 3,287,480 | 11/1966 | Wechsler et al. | 264/118 |
| 3,592,129 | 7/1971 | List | 425/201 |
| 3,627,865 | 12/1971 | Wittwer et al. | 264/118 |
| 3,991,440 | 11/1976 | Hendrickson, Jr. | 425/294 |
| 4,411,612 | 10/1983 | Holland | 425/331 |
| 4,976,907 | 12/1990 | Brotz | 425/201 |

Primary Examiner—Jay H. Woo
Assistant Examiner—Duane S. Smith
Attorney, Agent, or Firm—William Nitkin

[57] ABSTRACT

A mill roll for pelletizing material having first and second counter-rotating, cylindrical rollers, the second roller having a solid exterior at its central portion, a hollow core and a series of perforations at each end. The first roller has a solid exterior. The rollers can be heated. Material to be pelletized is placed in the central portion of the nip formed between the rollers and as the rollers rotate, the material is spread outward toward the perforations where the material passes through such perforations to be cut off by a knife disposed within the second roller's hollow core. Also disclosed is a method of pelletizing material utilizing such mill roll.

4 Claims, 1 Drawing Sheet

PELLETIZING ROLL

BACKGROUND OF THE INVENTION

1. Field of the Invention

The device and method of this invention reside in the area of roll mills and more particularly relate to a roll mill for the melting, shearing and pelletizing of material.

2. Description of the Prior Art

Roll mills and pelletizing rollers are known in the prior art. The inventor herein has a previous U.S. Pat. No. 4,976,907 entitled Pelletizing Roll and Method wherein conical-shaped rollers cause the material to be mixed and pass from the wider end of the rollers to the narrower end where the material is then forced through apertures for pelletization of such material.

SUMMARY OF THE INVENTION

It is an object of this invention to provide an improved pelletizing mill roll and method which operate differently from my earlier pelletizing roll mill and method utilizing conical-shaped members. The pelletizing roll mill of this invention has two cylindrically shaped rollers, the first of which is solid-faced and has heating means incorporated therein. The material to be mixed and pelletized is deposited in the nip formed between the two rollers. The second roller is hollow and has defined therearound at each end first and second pluralities of apertures extending around its circumference while the central portion of the second roller has no apertures. As the rollers are counter-rotated, the material to be pelletized is placed at the central portions of the rollers in the nip therebetween. As the rollers counter rotate, the material is heated, sheared and mixed in the nip and is forced around the rolls outwardly toward the ends of the rollers. As it reaches the ends of the rollers, the material is then forced through the apertures in the second roller. After the material passes through the apertures, it cools and solidifies. A pair of knife members are disposed inside each end of the second roller which each cut off material protruding through the apertures on the inside of the second roller, thereby creating a plurality of pellets of the material which pellets can be collected for use.

DESCRIPTION OF THE PREFERRED EMBODIMENT(S)

Figure 1:
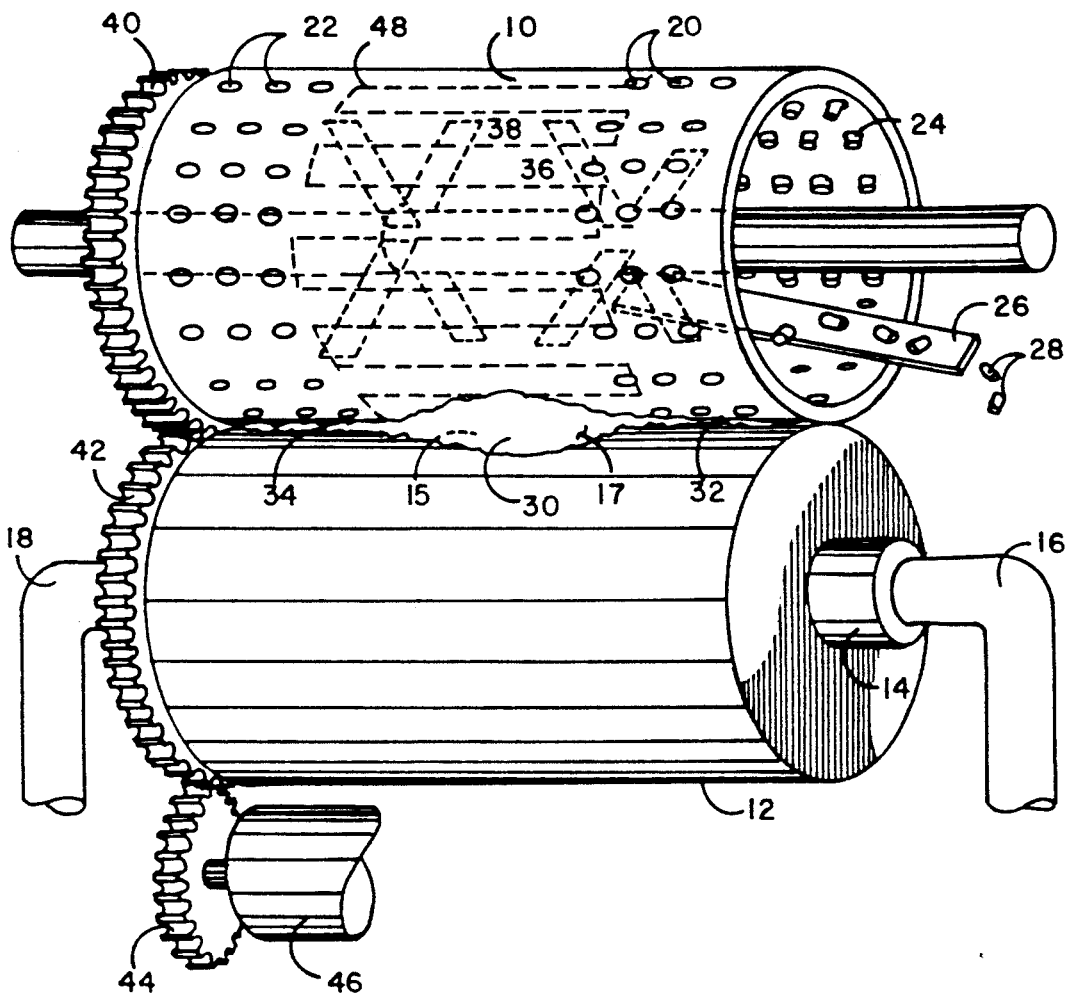
FIG. 1 illustrates a top perspective view of the pelletizing roll of this invention.

FIG. 1 illustrates a top perspective view of the pelletizing roll of this invention. First roller 12 which is solid around its cylindrical outer surface is rotated on axle 14 and includes heating means which can be provided by steam, electricity or any other equivalent heating means. In the example illustrated steam inlet pipe 16 and steam outlet pipe 18 allow heated steam to pass therethrough, causing first roller 12 to become heated. Second roller 10 is positioned adjacent to first roller 12, forming nip 15. The rollers can have gears 40 and 42 on their axles rotated by gear 44 driven by motor 46. The motor can, in some embodiments, be a high-torque DC variable drive motor. Material 30 is entered continuously into central part of nip 15. Central portion of second roller 12 has no apertures, but at each end of second roller 10 are a plurality of apertures such as right side apertures 20 left side apertures 22. Material 30, as it is sheared between the unperforated central portions of first roller 12 and second roller 10, starts to spread out and move into right end 32 and left end 34 of the two rollers. As material 30 reaches the outer ends of second roller 10, it is forced through the plurality of apertures 20 and 22. Second roller 10 counter rotates on axle shaft 36 in relation to the rotation of roller 12. Axle shaft 36 can be attached to the inside of roller 10. Roller 10 can be substantially hollow with an open core in its configuration with plurality of apertures 20 and 22 passing completely through the wall of the cylindrically shaped second roller 10. The material passing through apertures 20 and 22 will protrude, such as protruding material 24, along the inside of second roller 10. As the rollers counter-rotate, fixed knife 26 located at the right end of roller 10 is held in a position so that it is adjacent to the inside of cylindrical second roller 10 and cuts off protruding material 24 to form a plurality of pellets 28. A second knife member can be positioned at the left end of second roller 10 although in FIG. 1 only knife member 26 at the right end of roller 10 is shown. Such second knife member, not seen in this view, would be positioned in a similar manner as first knife member 26 on the inside left end of second roller 10 adjacent to the inside wall of second roller 10 and to the plurality of apertures 22. The central portion of second roller 10 can also be heated, if desired, for example by electric heater coil 48 disposed around the inside of the hollow core of second roller 10. The rollers can be made of refractory material heated by other means such as combustion therein of fuel and air, heat cartridges or by having lasers directed on them. Electrical induction heating is also useful for heating the perforated second roller.

In operation of the device of this invention, material 30 is deposited, sheared and mixed in the nip initially at the central portions of each of the rollers by the force of the rollers and spreads outward along the nip by the action of such mixing. Material 30 in some cases will tend to adhere around heated first roller 12. In some embodiments heated first roller 12 can have a matte finish, and the central non-perforated portion of second roller 10 can have a smooth finish so that the material being processed, as the rollers rotate, adheres more to heated first roller 12. As the material passes toward the outer ends of heated first roller 12 by the natural tendency of material 30 to spread out in the nip, it is then forced through apertures 20 and 22 at the end of the second roller and cut by the knife members, causing material 24 to be pelletized.

Although the present invention has been described with reference to particular embodiments, it will be apparent to those skilled in the art that variations and modifications can be substituted therefor without departing from the principles and spirit of the invention.

I claim:

1. A mill roll for pelletizing material, comprising:
   a first cylindrical roller having a solid exterior and first and second ends;
   a second cylindrical roller positioned next to said first roller, said second roller having first and second ends;
   means to counter-rotate said first and second rollers;
   a nip formed between said first and second rollers;
   a hollow core defined in said second roller;
   a first plurality of apertures defined at the first end of said second roller;

a second plurality of apertures defined at the second end of said second roller;

a centrally disposed non-perforated area disposed between said first and second plurality of apertures on said second roller; and knife means positioned at said first and second ends of said second roller within said hollow core to cut off portions of said material which pass from the nip defined between said first and second rollers through said first and second pluralities of apertures to the inside hollow core of said second roller.

2. The device of claim 1 further including means for heating said first roller.

3. The device of claim 2 wherein said heated first roller has a matte finish to provide more adherence to said material being processed in said mill roll and wherein the central portion of said second roller between said first and second pluralities of apertures has a smooth finish.

4. The device of claim 2 further including heating means for heating said second roller.

* * * * *